(12) United States Patent
Borghi et al.

(10) Patent No.: US 12,128,454 B2
(45) Date of Patent: Oct. 29, 2024

(54) RACK-TYPE MOBILE DEVICE FOR PRESENTING BREEDING CAGES AND PARTS THEREOF FOR WASHING, THE DEVICE BEING ADAPTED TO BE INSERTED INTO A WASHING/RINSING MACHINE FOR USE IN THE FIELD OF PHARMACEUTICAL PRECLINICAL RESEARCH

(71) Applicant: IWT S.R.L., Casale Litta (IT)

(72) Inventors: Matteo Borghi, Legnano (IT); Michele Vitali, Angera (IT)

(73) Assignee: IWT S.R.L., Casale Litta (IT)

( * ) Notice: Subject to any disclaimer, the term of this patent is extended or adjusted under 35 U.S.C. 154(b) by 245 days.

(21) Appl. No.: 17/748,627

(22) Filed: May 19, 2022

(65) Prior Publication Data

US 2022/0371061 A1 Nov. 24, 2022

(30) Foreign Application Priority Data

May 24, 2021 (IT) .......................... 102021000013352

(51) Int. Cl.
*B08B 3/04* (2006.01)
*A01K 29/00* (2006.01)

(52) U.S. Cl.
CPC ................. *B08B 3/04* (2013.01); *A01K 29/00* (2013.01)

(58) Field of Classification Search
CPC .......... A01K 1/03; A01K 1/031; A01K 1/032; A01K 29/00; A23B 4/062; A23B 4/064;
(Continued)

(56) References Cited

U.S. PATENT DOCUMENTS 2,746,882 A * 5/1956 Hamal .................... B62B 3/006
427/256
2,793,994 A * 5/1957 Novitsky ............... C25D 17/08
204/297.06
(Continued)

FOREIGN PATENT DOCUMENTS

CH 657545 A * 9/1986 ............. B08B 11/02
CN 201 959 321 U 9/2011
(Continued)

OTHER PUBLICATIONS

Italian Search Report dated Apr. 1, 2022, issued in Italian Application No. 102021000013352, filed May 24, 2021.

*Primary Examiner* — Joshua E Rodden
(74) *Attorney, Agent, or Firm* — Workman Nydegger

(57) ABSTRACT

A rack-type mobile device for presenting parts of breeding cages for washing, the device being adapted to be inserted into a washing/rinsing machine for use in pharmaceutical preclinical research centres, the device including: a load-bearing structural frame for the parts of breeding cages; apparatus adapted for moving the mobile device, connected to the frame; one or more hooking and positioning elements for hooking and positioning the parts of breeding cages on the device, the hooking and positioning elements being located on at least one lateral face of the frame and being constrained to the load-bearing structural frame; the hooking and positioning elements being shaped as an open hook tilted downwards relative to the horizontal plane, with the hook bottom facing outwards from the lateral face of the mobile device, and the hook tip facing inwards, the open hook having such a width as to be able to internally house at least a part of the cage parts.

9 Claims, 19 Drawing Sheets

(58) Field of Classification Search
CPC .......... A23B 4/066; A23B 4/068; B08B 3/04; B08B 9/0861; B08B 9/093; B08B 9/30; B08B 9/42; B08B 11/02; B08B 13/00; B62B 3/10; B62B 3/108; B62B 2203/00; B62B 2203/02; B62B 2203/04
USPC ............ 204/297.01, 297.06, 297.07, 297.08, 204/298.23; 211/71.01, 85.8, 119; 269/152; 280/47.35, 79.2, 79.3
See application file for complete search history.

(56) References Cited

U.S. PATENT DOCUMENTS

| | | | | |
|---|---|---|---|---|
| 3,830,200 | A * | 8/1974 | Patterson | A01K 1/031 119/419 |
| 6,571,968 | B1 * | 6/2003 | Cullen | B05B 5/082 118/500 |
| 8,501,259 | B2 * | 8/2013 | Vergara | A23B 4/062 280/47.35 |
| 8,919,582 | B1 * | 12/2014 | Kmetz, III | B62B 3/10 211/85.8 |
| 10,918,078 | B1 * | 2/2021 | Betts-Lacroix | A01K 29/005 |
| 2006/0236951 | A1 * | 10/2006 | Gabriel | A01K 1/031 119/455 |
| 2015/0334986 | A1 * | 11/2015 | Loyd | A01K 1/031 119/455 |

FOREIGN PATENT DOCUMENTS

| | | |
|---|---|---|
| CN | 209 136 105 U | 7/2019 |
| CN | 110 181 411 A | 8/2019 |
| CN | 212 310 358 U | 1/2021 |
| EP | 3 248 697 A1 | 11/2017 |
| WO | 2021/048729 A1 | 3/2021 |

* cited by examiner

RACK-TYPE MOBILE DEVICE FOR PRESENTING BREEDING CAGES AND PARTS THEREOF FOR WASHING, THE DEVICE BEING ADAPTED TO BE INSERTED INTO A WASHING/RINSING MACHINE FOR USE IN THE FIELD OF PHARMACEUTICAL PRECLINICAL RESEARCH

CROSS-REFERENCE TO RELATED APPLICATIONS

This application claims priority to Italian Application No. 102021000013352, filed May 24, 2021, which is incorporated herein by specific reference.

DESCRIPTION

Field of the Invention

The present invention relates to a rack-type mobile device for presenting breeding cages and parts thereof for washing, the device being adapted to be inserted into a washing/rinsing machine for use in pharmaceutical preclinical research centres.

Background Art

In the field of pharmaceutical preclinical research, and particularly in the field of breeding cages, and associated washing areas, where laboratory animals are bred, it is known that washing and/or rinsing systems need to be used for cleaning and reusing animal breeding cages of variable sizes manufactured using different technologies and different materials compatible with such application.

In particular, batch-type washing and/or rinsing systems exist which are based on variable-size machines wherein cages and components thereof are presented to the washing system after having been loaded on a presentation carriage suitable for both washing and transporting them; such machines are commonly called "rack washers", whereas such presentation carriages are called "presentation racks".

In addition to being manually loaded by an operator, such presentation racks may also, in some specific cases, be automated for both loading the cages and transporting the rack through the washing areas.

Presentation racks are usually so designed as to "present" cages and their accessory parts to the washing systems included in rack washer machines.

These washing systems may be of several types, e.g., with fixed, oscillating or translating rods or with rotary arms.

Such rack washer machines (FIG. 1) typically have a parallelepiped shape 1, wherein two lateral faces are usually the loading and unloading zones (indicated by the arrows, but the flow may also come from one side only), and the other two lateral faces are the zones where the washing systems are normally installed, while the top and bottom faces are the roof and the bottom of the machine and may carry further secondary washing systems.

The rack can also be schematized, by way of non-limiting example, as a parallelepipedon 2 (while it may also have a cylindrical shape or other known shapes), which is inserted into the machine and exposed to the washing systems.

It is clear that the lateral zones of the rack are more exposed to the washing systems; therefore, the cages are normally exposed on such two sides of the rack in order to make use of both washing banks.

As is known, a breeding cage (FIG. 3) essentially comprises a base 4 (FIG. 4a), a top 5 (FIG. 4b) and a trough ("lid") 6 (FIG. 4c). Nevertheless, cages may comprise other parts as well.

The racks known in the art (FIGS. 2 and 5) include containment shelves 3 for housing cage parts, whereon the latter can be laid and retained in such a way that they will remain correctly exposed to direct washing jets, and that most of the surfaces of the cage parts will stay inclined to ensure proper draining, so as to reduce fluid stagnation to a minimum at the end of the cycle and facilitate drying.

The shelves are also designed to prevent the impact force of the washing fluid from overturning or moving the cage parts, thus making the washing action ineffective or incorrectly repositioning them and causing accumulation of washing fluid within the cages themselves (e.g., cage inside turned upwards, acting as a container for the fluid).

Such shelves 3 may also be suitably used for housing, in addition to bases, tops 5, which are used for closing the cage bases and are very often washed together with said bases, as well as for housing lids 6, which are usually inserted in the cages. The shape of such tops is such as to allow only some specific presentation positions in the racks, in order to ensure complete water drainage from their surfaces, while lids are light components made of metal or plastic that can easily move during the washing and therefore, due to their very construction, are not subject to liquid stagnation.

The racks known in the art are manufactured by using different construction solutions according to the case, but substantially suffer from the following main drawbacks:

In order to be able to load cage parts, in particular bigger ones, a gap is required between the shelves which must be greater than the biggest size (in particular, the base depth) to be loaded. In fact, if the shelves are vertically close to each other, more rows will be available, but it will be impossible to load such bigger bases.

No specific containment systems exist for bases, tops and lids: when the rack is not fully loaded, bases and tops will very often tend to fall sideways, resulting in poor exposure to the washing jets and potential creation of washing liquid accumulation areas. Moreover, lids are often stacked to prevent them from moving, since they are very light and cannot be placed in a specific position, resulting in drastically reduced washing performance.

Furthermore, the chosen construction sometimes makes such racks very bulky and heavy, so that they are difficult to move within the washing area, hindering also the loading and unloading thereof from the machine 1: it may happen, in fact, that in some areas access to the washing chamber is provided through inclined ramps, where the architectural situation of the washing area is such that these machines cannot be installed on a suitable baseplate provided with a water collection pit under the floor level.

Due to such construction geometries, the solutions currently employed are normally based on fixed systems, i.e., the number of horizontal rows cannot be configured. Therefore, the racks are dedicated to a given cage set, and a different configuration will require changing the whole rack.

SUMMARY OF THE INVENTION

It is therefore an object of the present invention to provide a rack-type mobile device for presenting breeding cages and parts thereof for washing, the device being adapted to be inserted into a washing/rinsing machine for use in the field of pharmaceutical preclinical research, which can overcome all of the above-mentioned drawbacks.

The present invention concerns a novel type of rack-shaped mobile device comprising a system for loading bases, tops and lids of breeding cages, which, as it replaces the traditional object containment system, wherein the parts are positioned and laid thereon, with a system wherein the parts are hooked and retained thereon, provides a significant increase, the available height of the mobile device being equal, in the number of rows and hence in the number of bases, tops and lids that can be loaded, while still presenting the latter properly and also promoting a correct retention of said parts in all directions, with no inappropriate displacement thereof.

The present invention aims to provide a rack-type mobile device for presenting parts of breeding cages for washing, the device being adapted to be inserted into a washing/rinsing machine for use in pharmaceutical preclinical research centres, the device comprising:

a load-bearing structural frame for said parts or breeding cages;

means adapted for moving said mobile device, connected to said frame;

one or more hooking and positioning elements for hooking and positioning said parts of breeding cages on said device, said hooking and positioning elements being located on at least one lateral face of the frame and being constrained to said load-bearing structural frame; said hooking and positioning elements being shaped as an open hook tilted downwards relative to the horizontal plane, with the hook bottom facing outwards from said lateral face part of the mobile device, and the hook tip facing inwards, said open hook having such a width as to be able to internally house at least a part of said cage parts.

It is a particular object of the present invention to provide a rack-type mobile device for presenting breeding cages and parts thereof for washing, the device being adapted to be inserted into a washing/rinsing machine for use in the field of pharmaceutical preclinical research, as will be further set out in the claims, which are an integral part of the present description.

BRIEF DESCRIPTION OF THE DRAWINGS

Further objects and advantages of the present invention will become apparent in light of the following detailed description of an exemplary embodiment (and variants thereof) provided herein with reference to the annexed drawings, which are only supplied by way of non-limiting example, wherein.

In the drawings, the same reference numerals and letters identify the same items or components.

DETAILED DESCRIPTION OF SOME EMBODIMENTS

Figure 1:
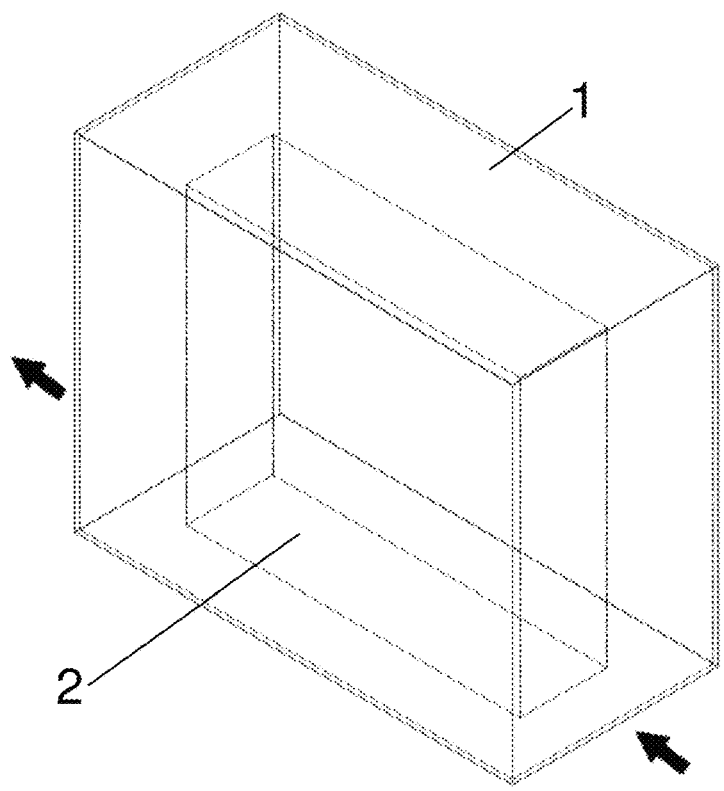
FIG. 1 schematically shows an example of a rack washer machine in which a prior-art rack has been inserted.
Figure 2:
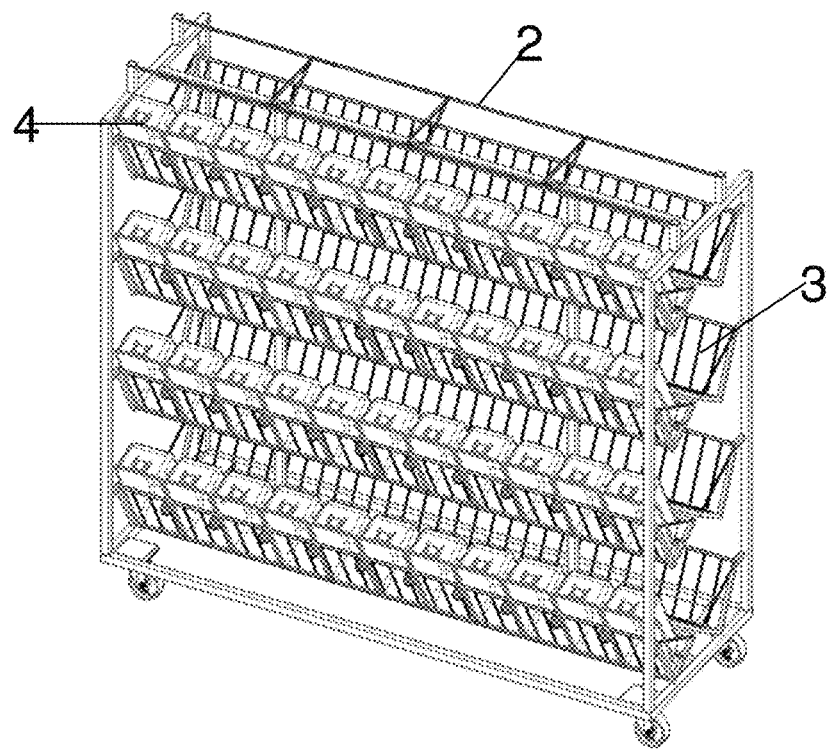
FIGS. 2 and 5 schematically show a perspective view and a sectional side view, respectively, of a prior-art rack.
Figure 3:
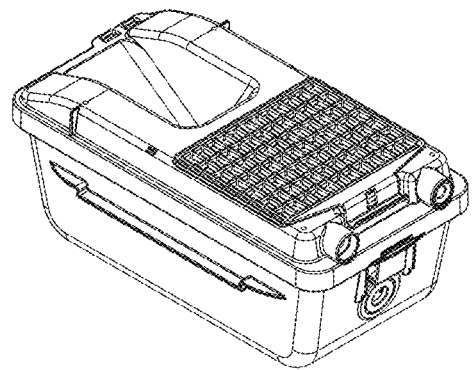
FIG. 3 shows an example of a breeding cage.
Figure 4A:
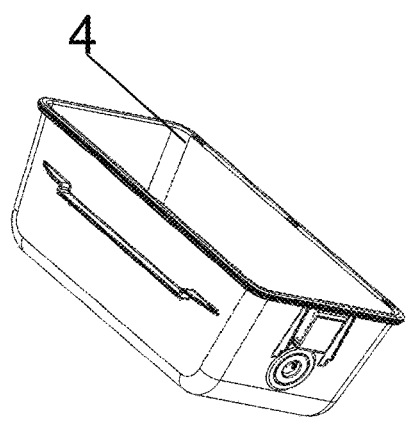
FIGS. 4a, 4b and 4c show, respectively, examples of a base, a top and a lid of the cage.
Figure 4B:
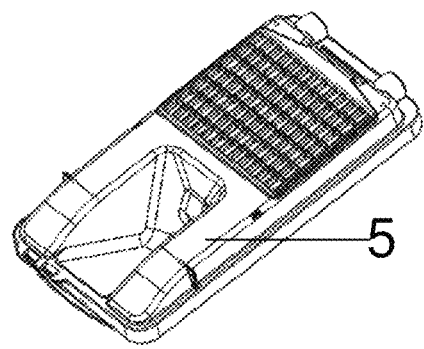
Figure 4C:
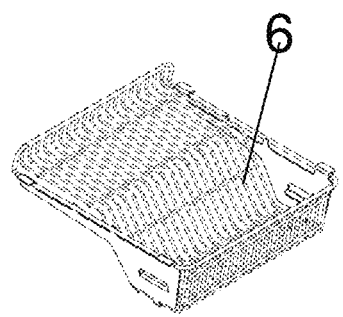
Figure 5:
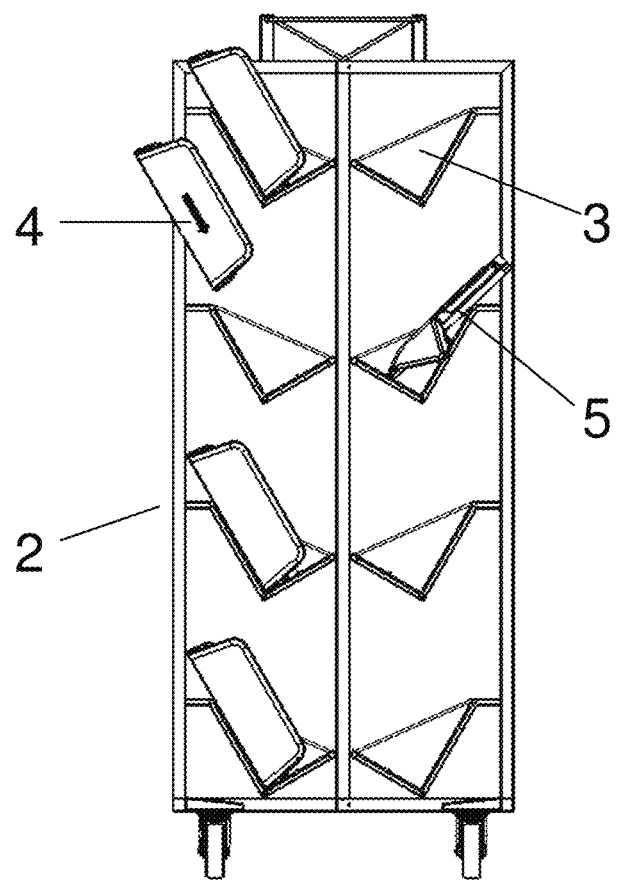

As mentioned above, the present invention relates to a novel type of rack-shaped mobile device comprising a system for loading bases, tops and lids, or other parts, of breeding cages, which provides, the available height of the mobile device being the same, a significant increase in the number of rows, and hence in the number of bases, tops and lids, or other parts, that can be loaded, while still properly presenting the latter and also promoting retention in all directions.

In a first construction variant, such mobile device is essentially made up of the following main elements (FIGS. 6, 7 and 8):

A load-bearing structural frame 10 (hereafter referred to as frame), which may be manufactured, for example, by means of horizontally and vertically interconnecting metal tubes or sections, preferably comprising zones 13 that can be easily gripped by an operator for moving it, e.g., comprising vertical bars at the sides of the frame. The frame also includes additional members 10', preferably developing vertically (hereafter referred to as vertical members) interconnected with members 10" preferably developing horizontally (hereafter referred to as horizontal members) (see also the details in FIGS. 15, 16, 17) arranged in a central position on the frame;

A moving device 11, preferably connected to the frame base, comprising rotary elements 12 adapted for moving the mobile device (by way of non-limiting example, wheels, pivoting wheels, rollers or guides).

A hooking structure 14 that comprises suitable stable hooking and positioning elements 15, preferably arranged on both lateral parts of the frame, and preferably constrained to the horizontal members 10", e.g., by means of quick-coupling systems and/or removable fastening systems (screw, bolt or the like) and/or fixed fastening system (welding or riveting), as will be further described hereinafter. Said hooking structure is adapted to support bases, tops and lids or other cage parts.

Preferably, suitable countering elements 16 for countering the thrust exerted by the pressure of the washing liquid against the bases, tops and lids. In a non-limiting example, said countering elements 16 are implemented as gravity pendulums, preferably pivotally connected to the hooking systems 15, and contribute to permitting a correct presentation of the bases, tops and lids.

Other features and variants of the above-mentioned elements of the mobile device will be described in detail below.

Figure 9A:
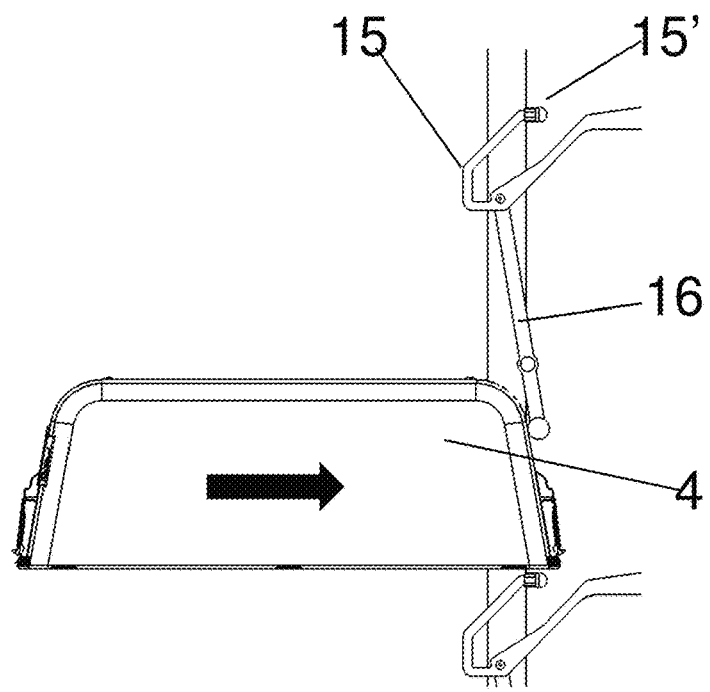
FIGS. 9a, 9b, 9c and 10 show a part of the rack-type mobile device, highlighting one possible way of inserting a cage base in the hooks according to the invention.
Figure 9B:
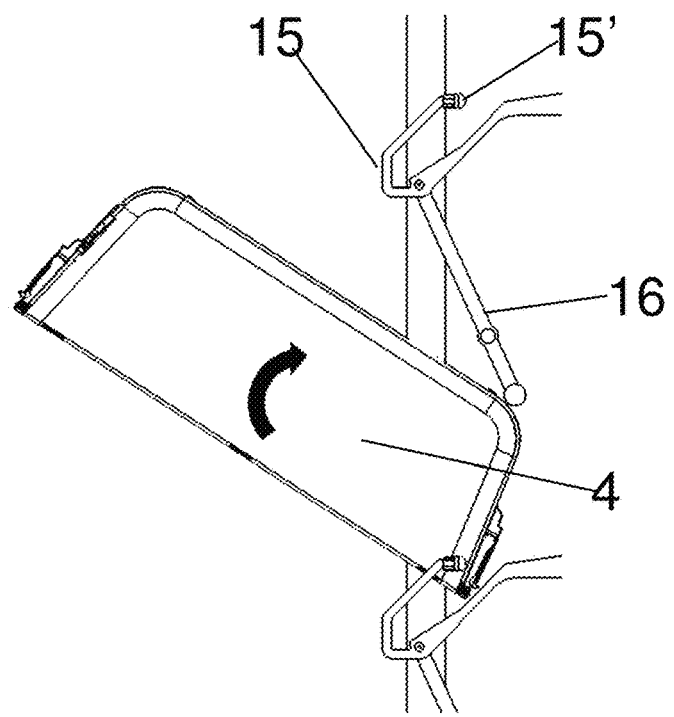
Figure 9C:
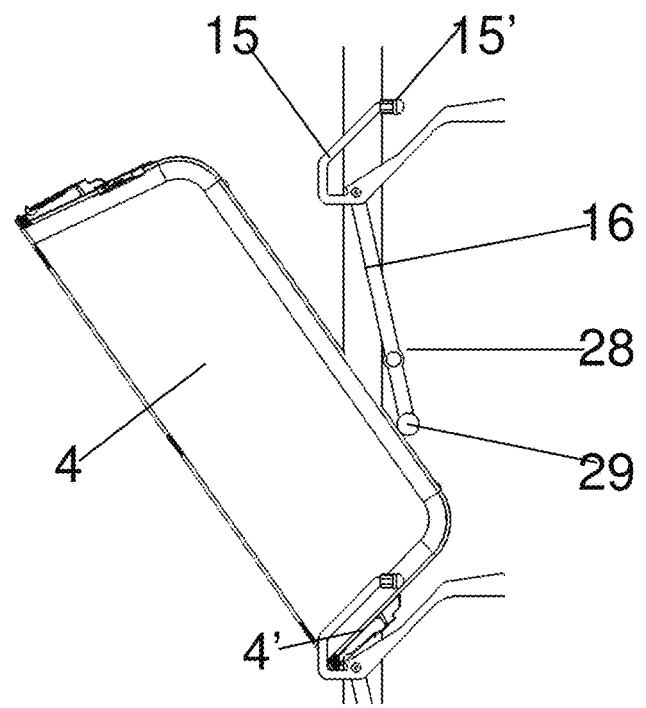

As shown in FIGS. 9a, 9b, 9c, the element of the stable hooking and positioning system 15 (hereafter also referred to as hooking element or hook) is preferably shaped as an open hook tilted downwards relative to the horizontal plane (by way of non-limiting example, the angle may range from 30 to 60 degrees), projecting outwards from the lateral part of the mobile device, with the hook bottom facing outwards and the hook tip facing inwards, and the tip preferably has a terminal part 15' bent towards the inside of the hook. Advantageously, the conformation is such that only the terminal part 15' of the hook tip will come in contact with the internal part of the base 4, which is where washing is most critical, thus minimizing the creation of "shady" washing areas in the base. The same result is obtained with other cage parts. The hook width is such that it can internally house a part of said cage parts. As can be seen in FIGS. 9a, 9b, 9c, the base 4 can be inserted in the hook by rotating it in such a way that an edge 4' thereof enters the hook 15. The constraint created by the hook will still allow some slight oscillatory motion of the base during the normal washing process, caused by the pressure of the liquid, so that also the point of contact will be appropriately washed.

In one possible variant, the inclination of the stable hooking and positioning elements 15 can be changed by means of an angle adjustment system, not shown in the drawings.

The countering element 16, if present, is free to oscillate and adapts itself by abutting at its rear on the back of the base 4, thereby improving the retention effect, especially with very light cages that may undergo critical movements under the hydraulic thrust. Anyway, the presence of the countering element 16 is not essential for properly supporting the base 4.

Since at least two hooks are engaged for each base (as will be explained hereinafter), the system also prevents the bases from moving sideways past the limits allowed by the hooks.

The hooking system differs from a prior-art supporting system in that it permits keeping a suitable distance in the vertical direction between the supporting elements 15 and hence between the horizontal rows of cages, depending on the size of the latter, while increasing the number of the same, the total height of the rack-type mobile device being equal. The horizontal rows of cages can be arranged at a mutual distance which is shorter than the length of the cages on the same lateral part. This makes it possible to load big and deep cages while keeping them spaced apart and partially overlapped in the horizontal direction.

Figure 16:
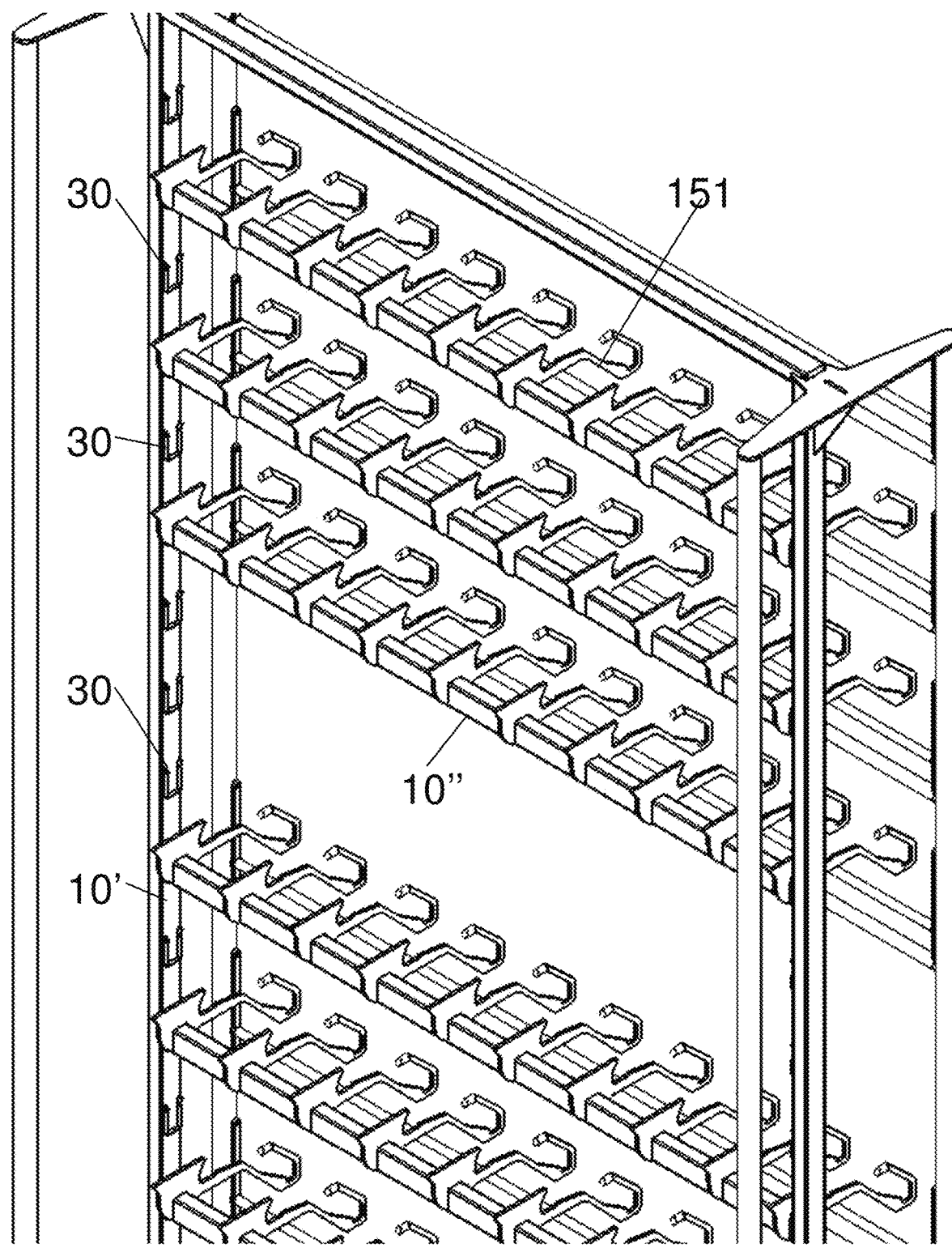
FIGS. 16 and 17 show perspective views of a single-faced variant of the rack-type mobile device according to the invention.
Figure 17:
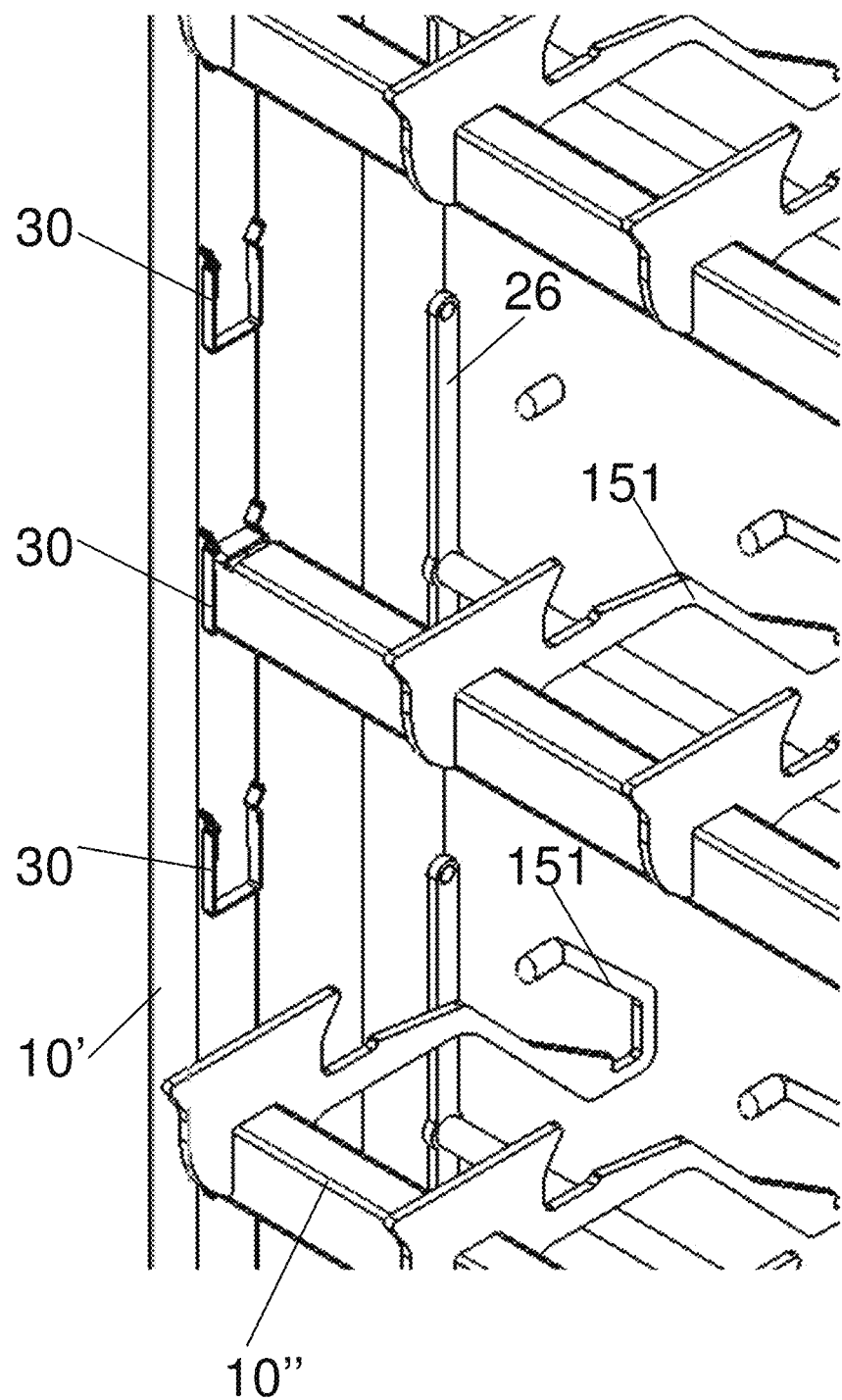

Advantageously, in fact, the horizontal rows can be positioned at a mutual distance that can be adjusted either in steps or continuously, by means of quick-coupling systems and/or removable fastening systems (screw, bolt, or the like) and/or fixed fastening systems (welding or riveting) positioned on the vertical members 10'. A non-limiting example is shown in FIGS. 16 and 17, wherein sets of U-shaped hooking systems 30 are present on the vertical members 10', into which the horizontal members 10" can be fitted.

In a variant not shown in the drawings, the hooks 15 may also slide continuously and then be fixed, or move in fixed steps along the horizontal direction, and possibly removed, in order to facilitate the positioning according to the type of cage to be processed.

In a variant not shown in the drawings, such hooks, which, as aforementioned, are at least two per cage, can be obtained from a single supporting element 15.

As aforesaid, the system for hooking the base 4 is based on a rotational movement of the base, which allows the latter to be inserted in the hooks 15 by exploiting the gap between two successive levels of horizontal members 10" and to be correctly presented for washing (FIGS. 9a, 9b, 9c). Once in the final position, the cage is retained by the hook, the geometry of which is such that it will prevent any undesired displacement. Preferably, each cage is retained by at least two hooks. The number of hooks per cage may depend on the cage size; therefore, more than two hooks, e.g., three hooks, may be used for bigger cages. The distance between successive hooks on the horizontal member 10" may thus vary according to specific requirements and dimensions of the items to be treated. The bases 4 may be inserted in the hooks 15 by the shorter or longer sides thereof.

Figure 10:
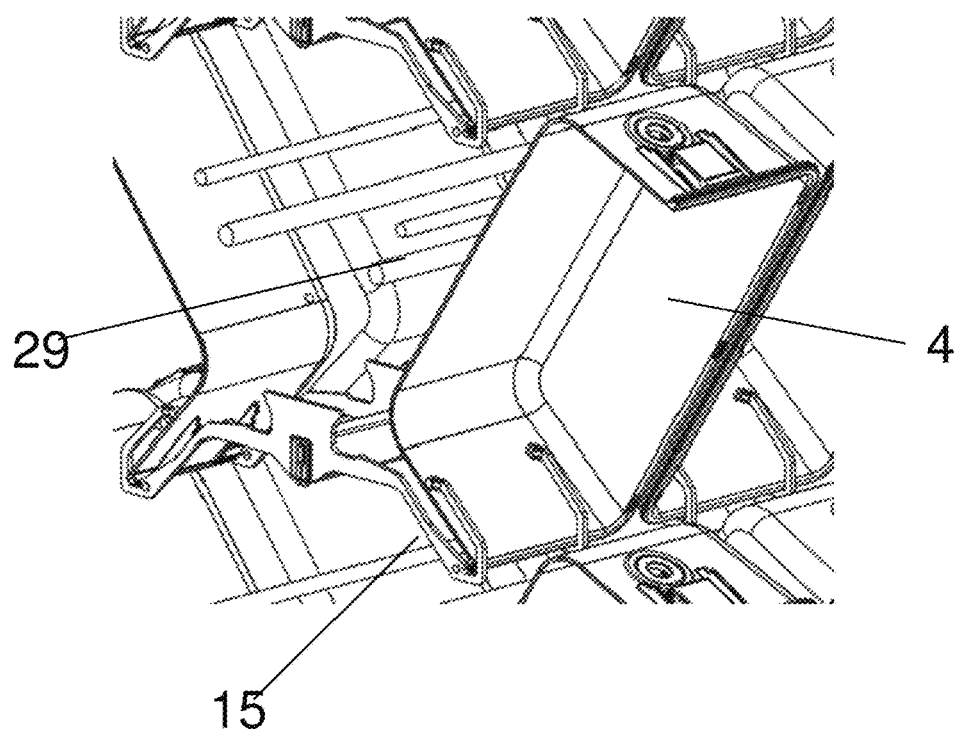
Figure 11A:
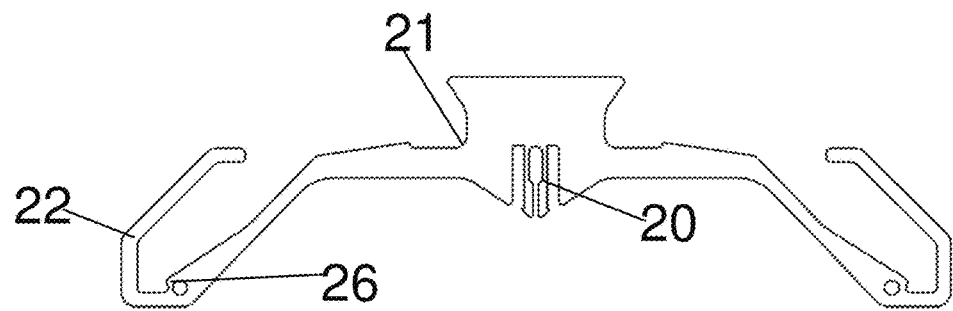
FIGS. 11a to 11e show some illustrative constructions of hooks according to the invention.
Figure 11B:
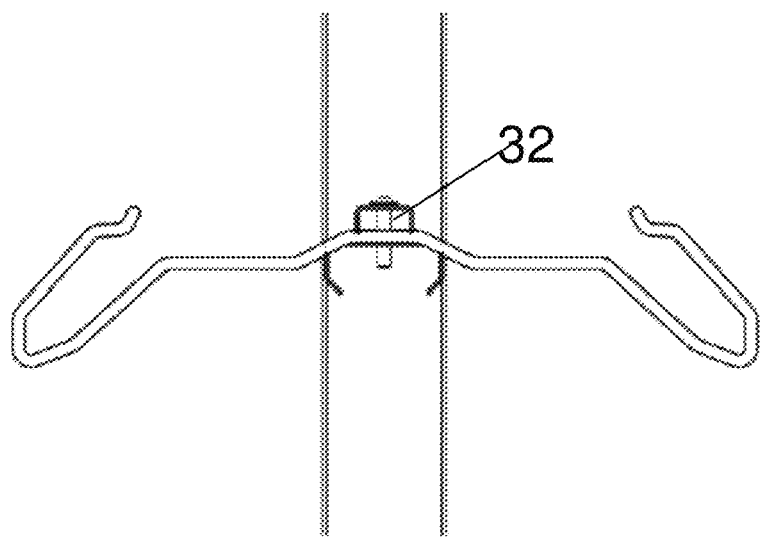
Figure 11C:
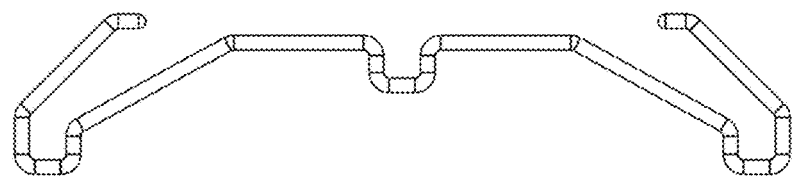
Figure 11D:
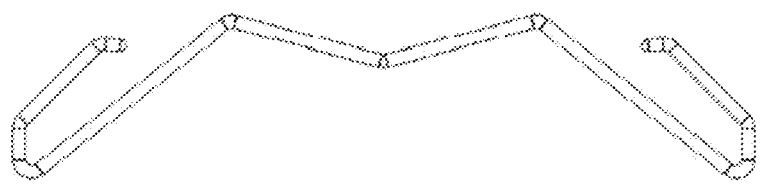

The above-described hooking system represents a non-limiting example of possible construction variants. In this case, the geometry of the terminal part 22 of the hook (FIG. 11a, also visible in FIGS. 9c and 10) is designed to optimally retain the edge 4' of the most common types of bases available on the market. The terminal part 22 of the hook is preferably so shaped as to rest on the edge 4' of the cage.

In one variant (FIG. 11a), the hooking system 15 comprises a quick fitting 20 for connecting to a matching slot formed in the horizontal member 10" of the frame.

Figure 13:
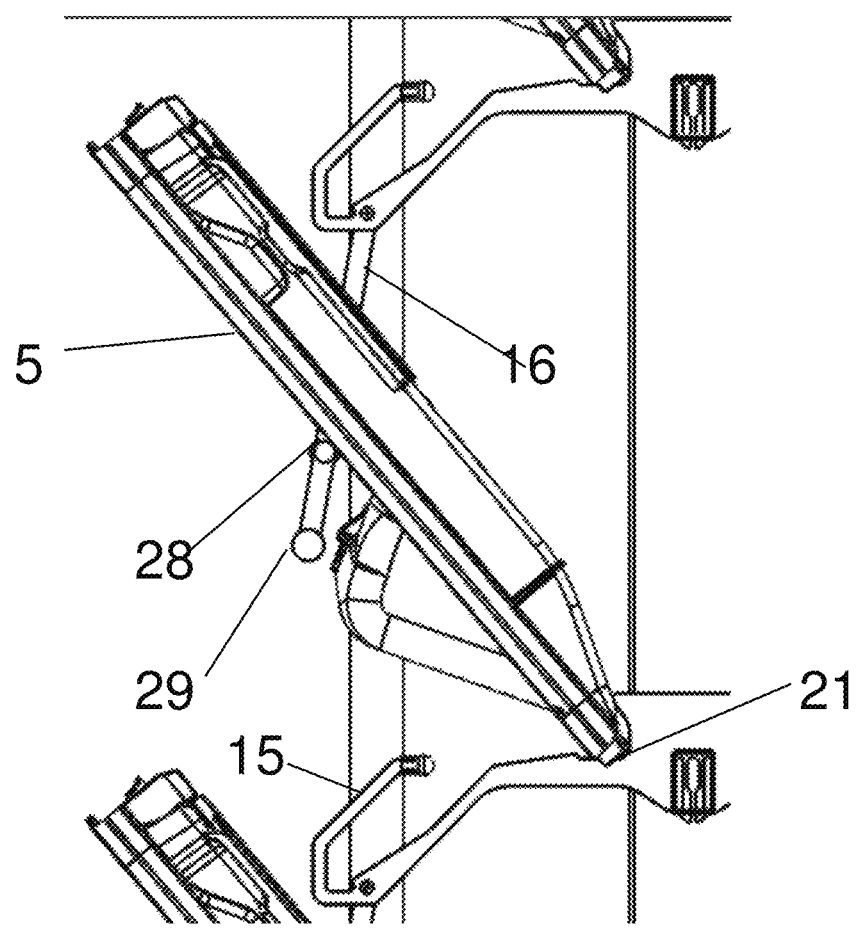
FIG. 13 shows one possible variant of the method of insertion of a cage top in the hooks according to the invention.

In one variant (FIG. 11a), the hooking system 15 has a recessed zone 21, behind the hook, oriented towards the horizontal member 10" and optimized for containing and supporting a part of the cage, preferably a part of the edge of the top 5 (FIG. 13). The position of the top is also defined by the oscillating countering element 16 in front of the top, as will be further described below.

The terminal part 15' of the hooking system that rests on the cages may be protected by a suitable washable soft plastic plug, preventing the inside of the cage from getting scored.

As far as additional construction details of the hooking system are concerned, it may be constructed as highlighted in FIGS. 11a to 11e, e.g., by using metal sheets cut by laser or other metal cutting technologies, or moulded plastic, or suitably shaped metal rods.

The connection to the frame may be achieved by suitably shaping the hooking system and the seat on the horizontal member 10", or by fastening it with a screw 32 (FIG. 11b), or by welding.

In a version not shown in the drawings, such connection to the frame is achieved by means of a continuous positioning and locking system adapted to adjust the distance between the hooking systems.

Figure 11E:
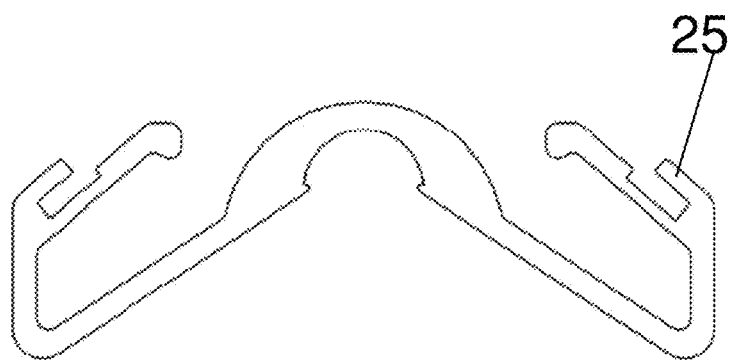

The zone intended for retaining the lid 6 or the top 5 may be provided as highlighted in FIG. 11e, through a U-shaped seat 25 having an opening oriented towards the inside, above the hook edge 22, into which the lower edge of a cage part, in particular a lid 6 or a top 5, can be fitted.

It must be pointed out that the hooking system has a one-piece dual structure that extends on both lateral parts of the mobile device, thus comprising two opposing hooks.

It is nevertheless possible, for each one of the above-described variants, to employ hooking systems having a single extension 151 separately on each one of the two lateral parts of the mobile device, as shown in FIGS. 16 and 17.

It is also possible to create a single-bank mobile device, as highlighted in FIGS. 16 and 17, wherein it can be noticed that the hooks have a single extension 151 towards just one lateral part of the mobile device.

It is possible to provide specific frame connections and, for example, containment zones specially dedicated to tops or lids in different suitable positions.

Figure 6:
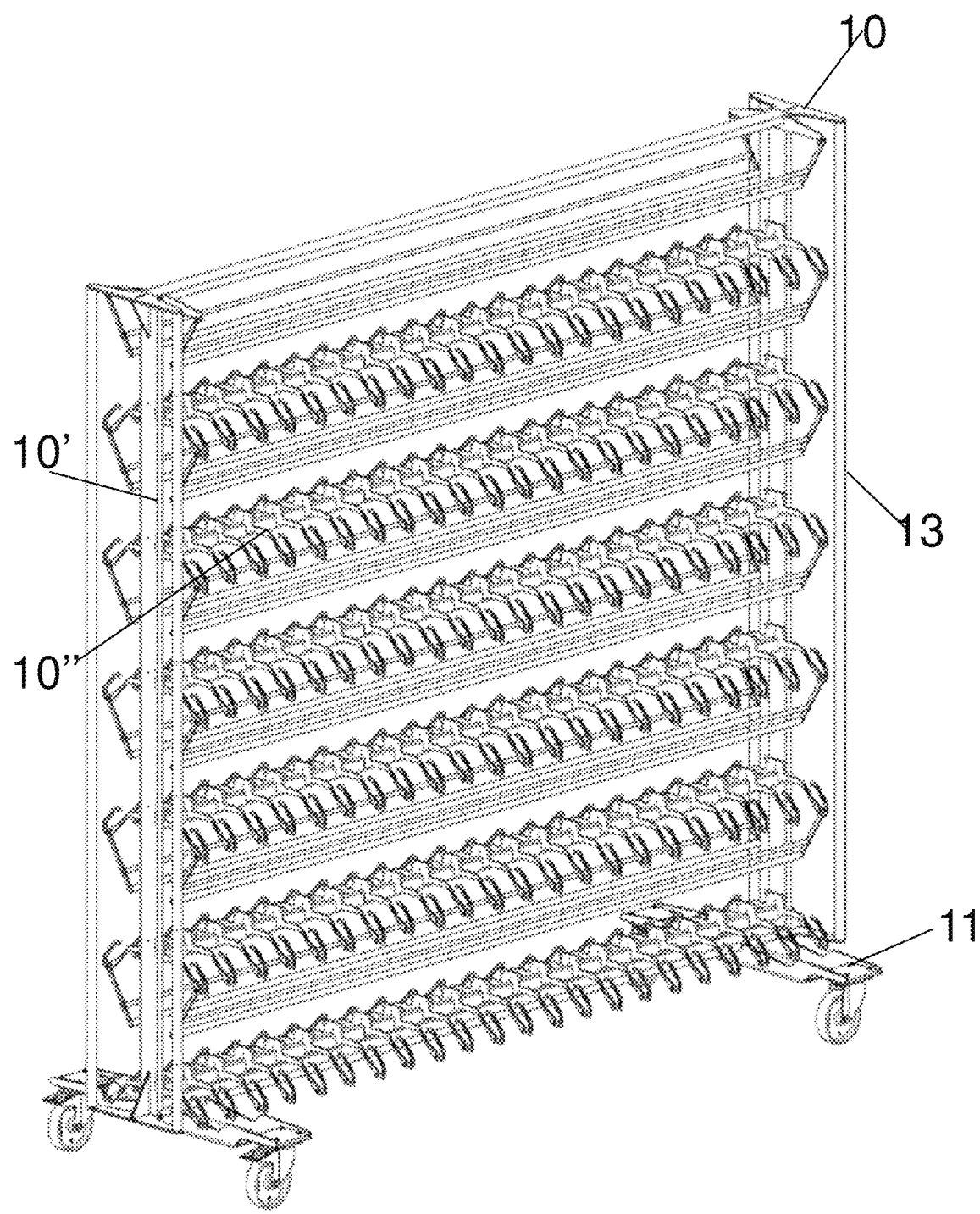
FIGS. 6, 7 and 8 show a perspective view, a perspective view with loaded cage bases, and a sectional side view, respectively, of the rack-type mobile device according to the invention.
Figure 7:
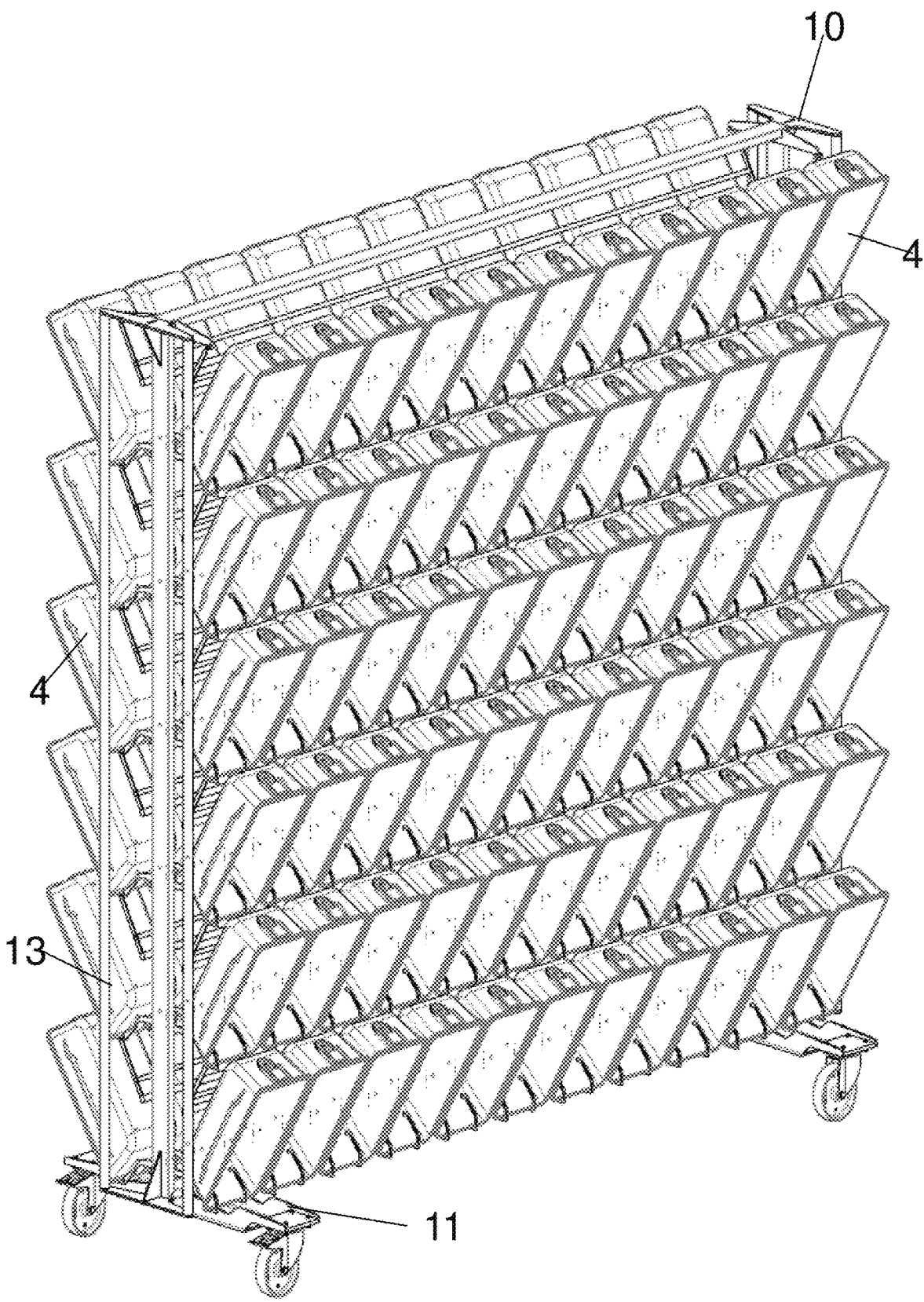
Figure 8:
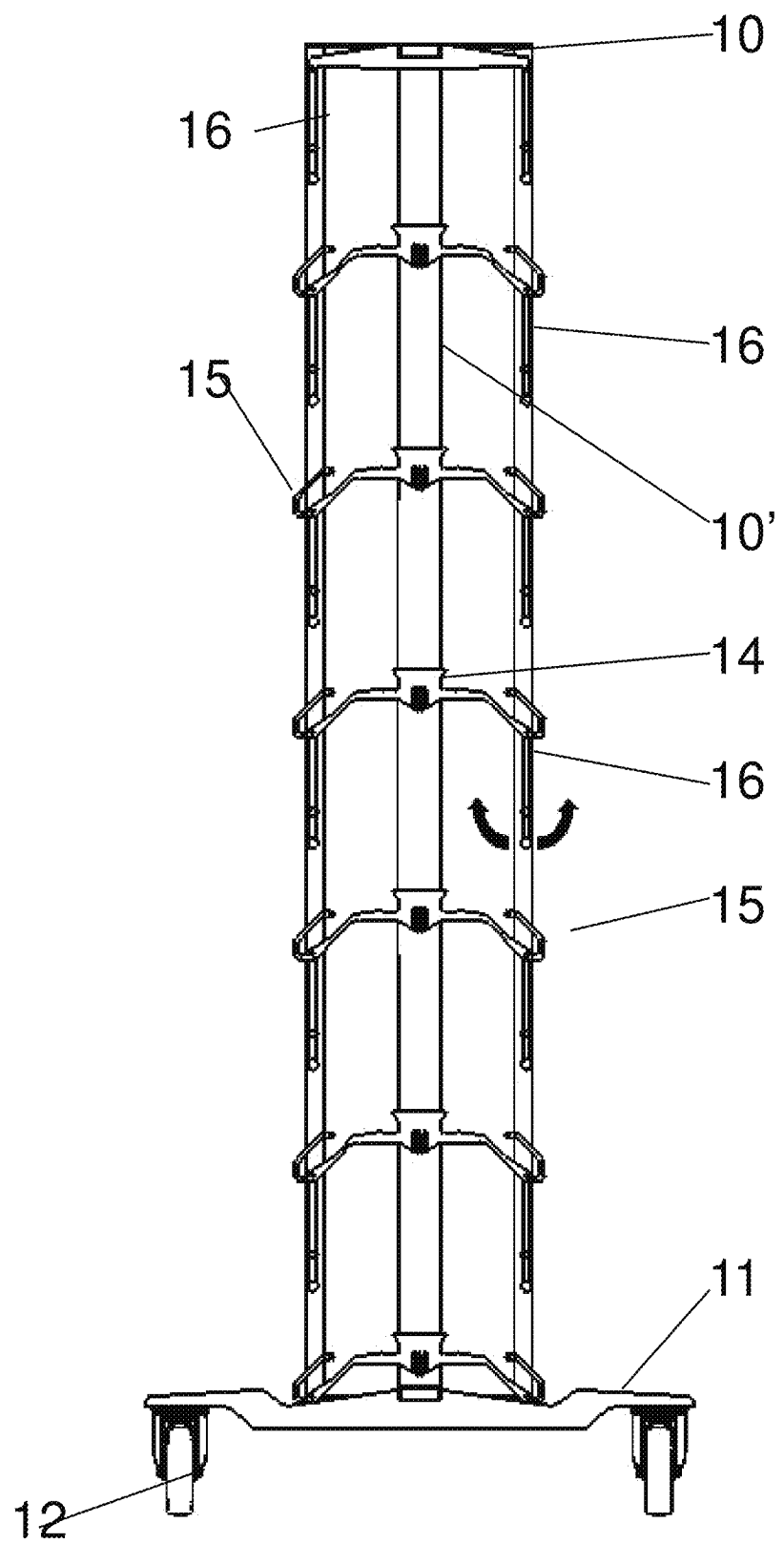

As concerns the hydraulic thrust countering element 16 (see details in FIG. 12), it may be provided as a countering element oscillating by gravity and pivotally attached to fastening points 26, e.g., provided on the hooks 15 (FIG. 11a), or, as an alternative, it may be pivotally connected to any other member of the frame. For example, as shown in FIGS. 6 and 8, it may be connected to an upward-protruding extension of the frame, or, as shown in FIGS. 16 and 17, to the vertical structures of the frame.

Figure 12:
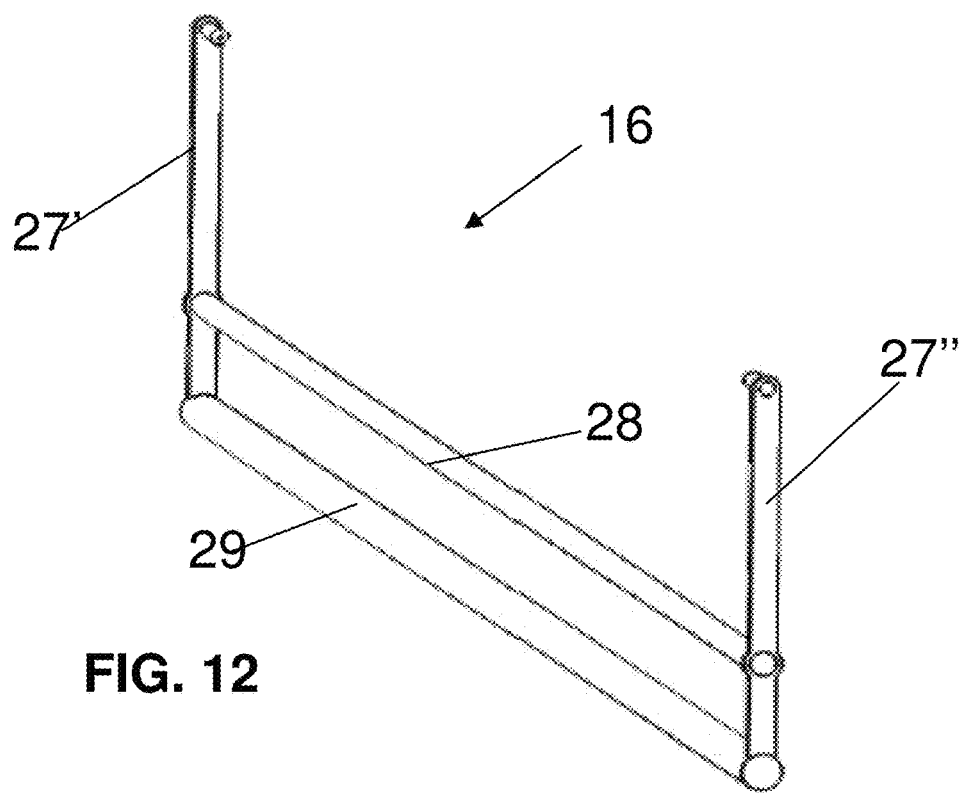
FIG. 12 shows an illustrative construction of a countering element according to the invention.

In the non-limiting example illustrated in FIG. 12, the countering element 16 is made up of at least two vertical supporting elements 27', 27" pivoted to fastening points 26 (or other points of the frame, as mentioned above) and connected to one or more parallel longitudinal elements (e.g., having a circular cross-section). The figure shows two parallel longitudinal elements 28, 29 adapted to create the zone for supporting and retaining the base bottom (preferably, the element 29 resting against the back of the base bottom, see FIG. 10) and the zone for supporting the tops in the correct position (preferably, the element 28 supporting the tops at the front, see also FIG. 13 and the above description of the same). FIG. 13 shows the relative positions of the top and of the countering element 16.

In one variant, the countering element 16 may have a different number of longitudinal elements, e.g., only one.

Figure 14:
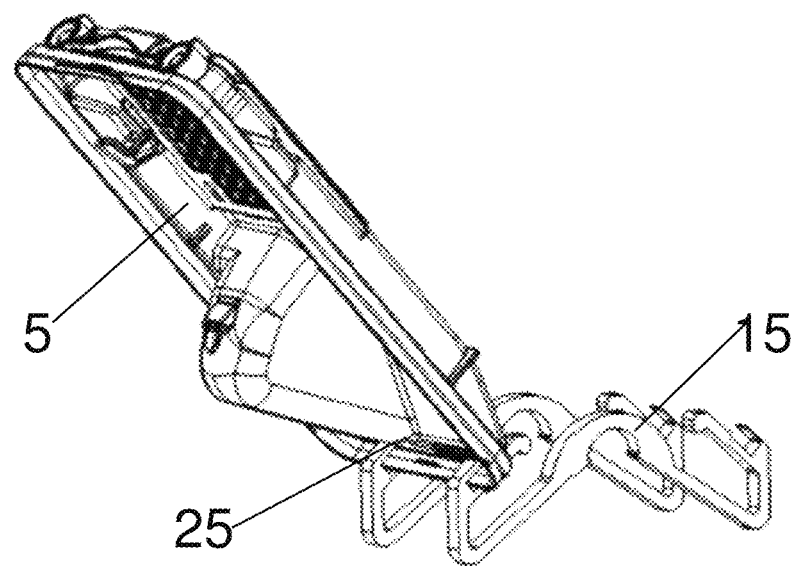
FIGS. 14 and 14a show a perspective view and a sectional side view, respectively, of another possible variant of the method of insertion of a cage top in the hooks according to the invention.
Figure 14A:
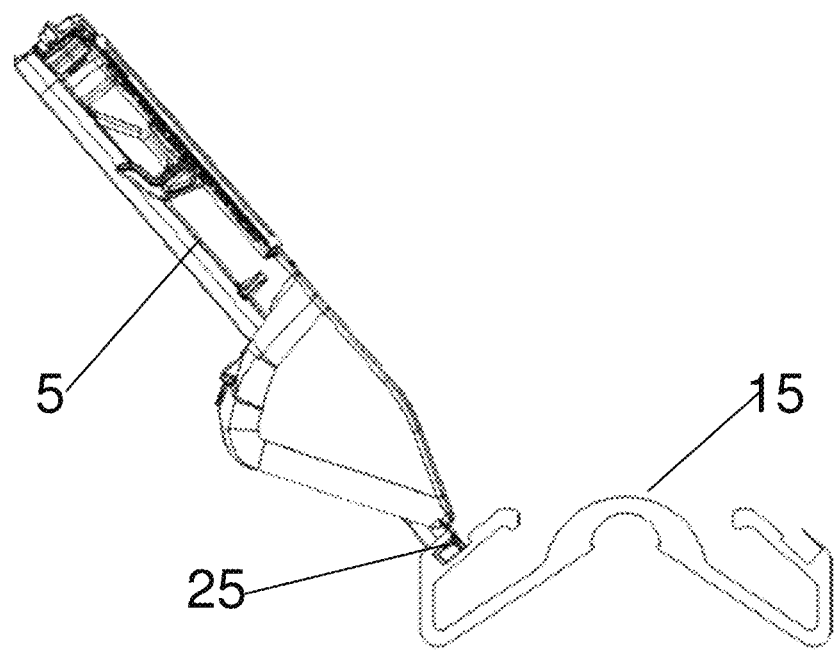

In one variant, the tops 5 may be arranged by fitting them into the seats 25 (FIG. 11e) of the hooks 15 (FIGS. 14 and 14a). Or the tops may be inserted by directly fitting them into the seats of the hooks 15. The presence of the countering element 16 is not, therefore, essential for properly supporting the tops.

The weight of the countering element in relation to the lever arm generated (through the vertical supporting elements 27', 27"), and hence to the hooking point 26, permits, on the one hand, an easy positioning of the components by swinging it, while on the other hand generating a supporting counterthrust sufficient to resist the thrust exerted on the cages by the washing jets.

The countering element 16 may be made of metal.

The same result can be attained by using different construction solutions or by exploiting dedicated supporting systems or systems connected differently to the rest of the frame; in addition, dedicated solutions may be provided for particular types of components.

Figure 15:
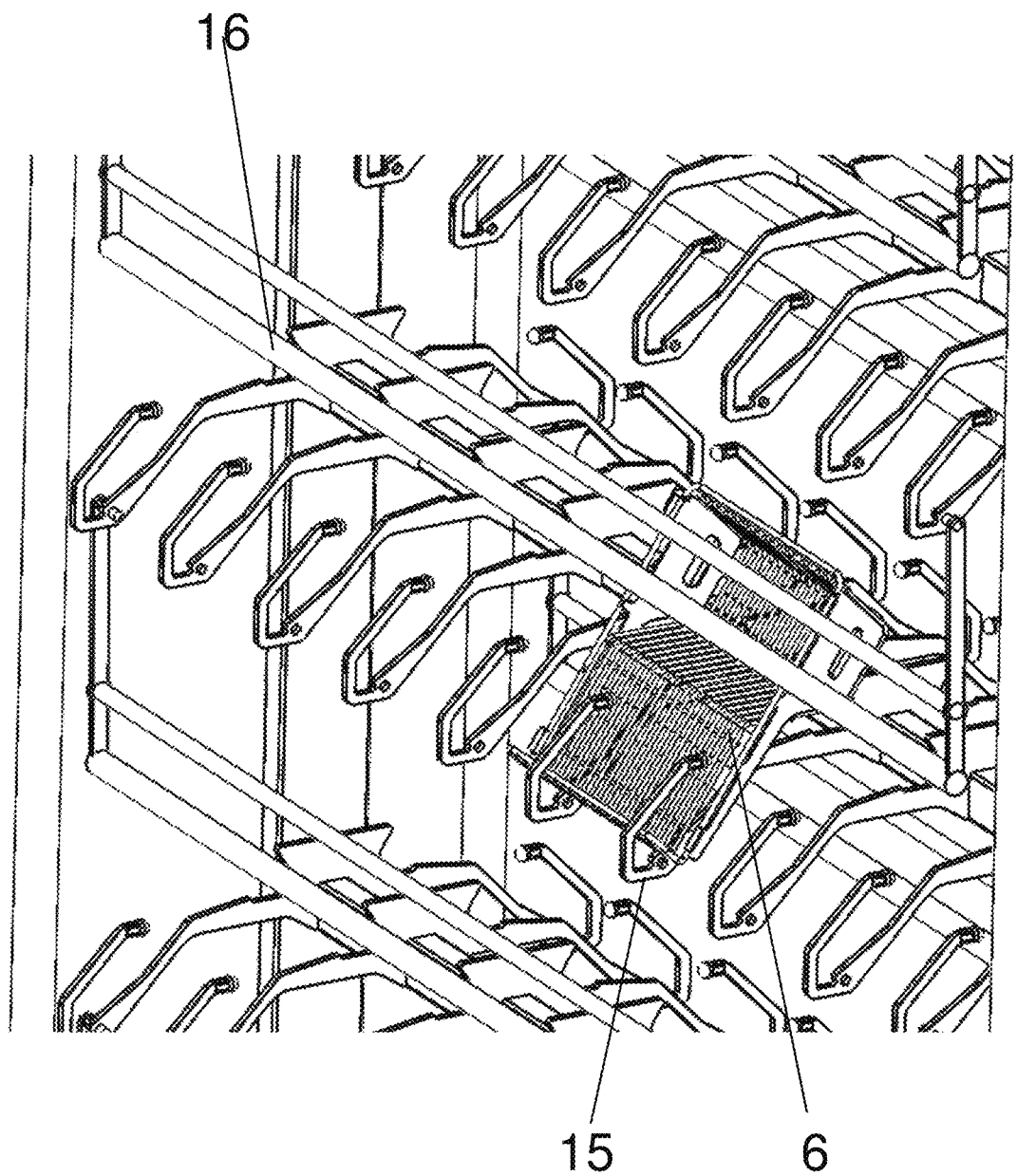
FIGS. 15 and 15a show a perspective view and a sectional side view, respectively, of a part of the rack-type mobile device, highlighting one possible method of insertion of a cage lid in the hooks according to the invention.

As concerns the lids 6, they can be inserted in the hooks 15 in a backward-tilted position. The suitable conformation of the hooks 15 permits presenting the lids 6 side by side, as opposed to overlapped, while nevertheless ensuring full retention thereof (FIG. 15).

The countering element 16, if present, in front of the lids may contribute to correctly retaining the lids, but it is an optional, non-essential part.

Figure 15A:
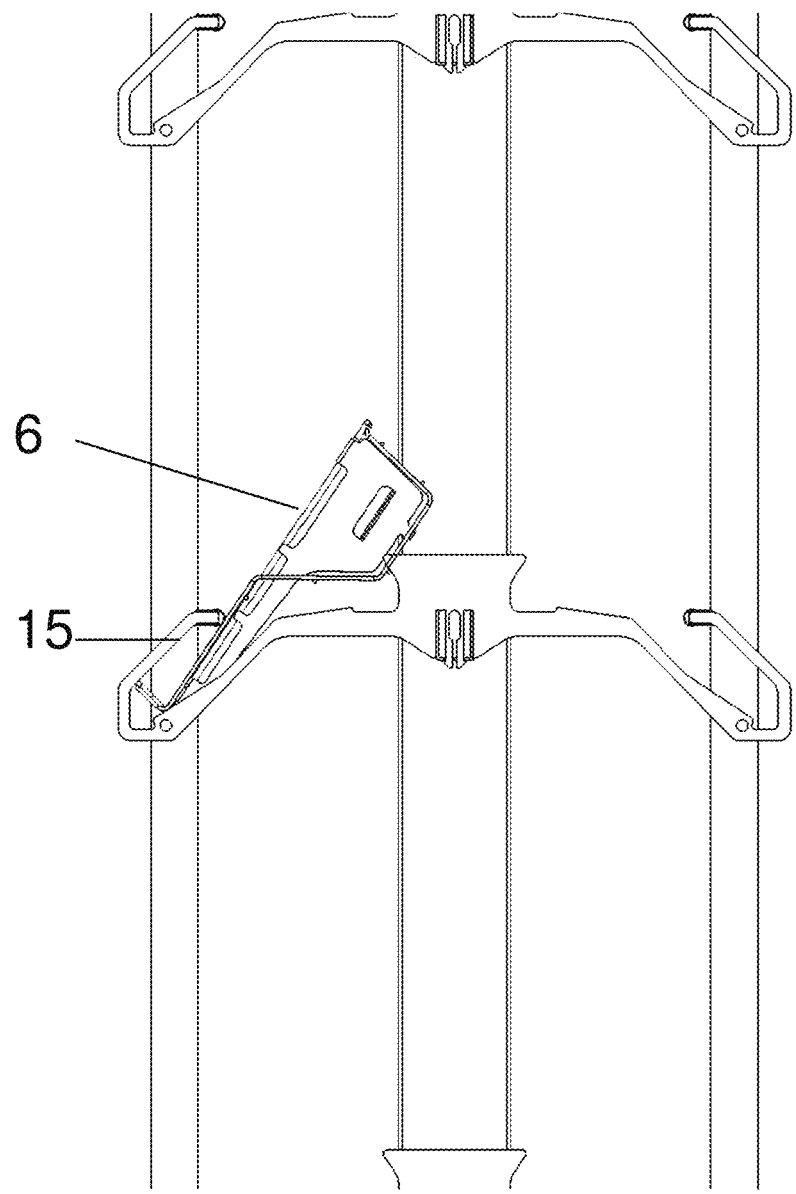

It is in fact possible (FIG. 15a) to load the lids 6 by fitting them into the hooks 15 even in the absence of the countering element 16.

The following will describe some further construction variants of the frame of the rack-type mobile device of the invention, as alternatives to the above-described solution making use of single horizontal central elements supporting the stable hooking and positioning elements 15. The frame variant described below can be used in combination with all of the above-described embodiments of the stable hooking and positioning elements 15.

Figures 18A, 18B:
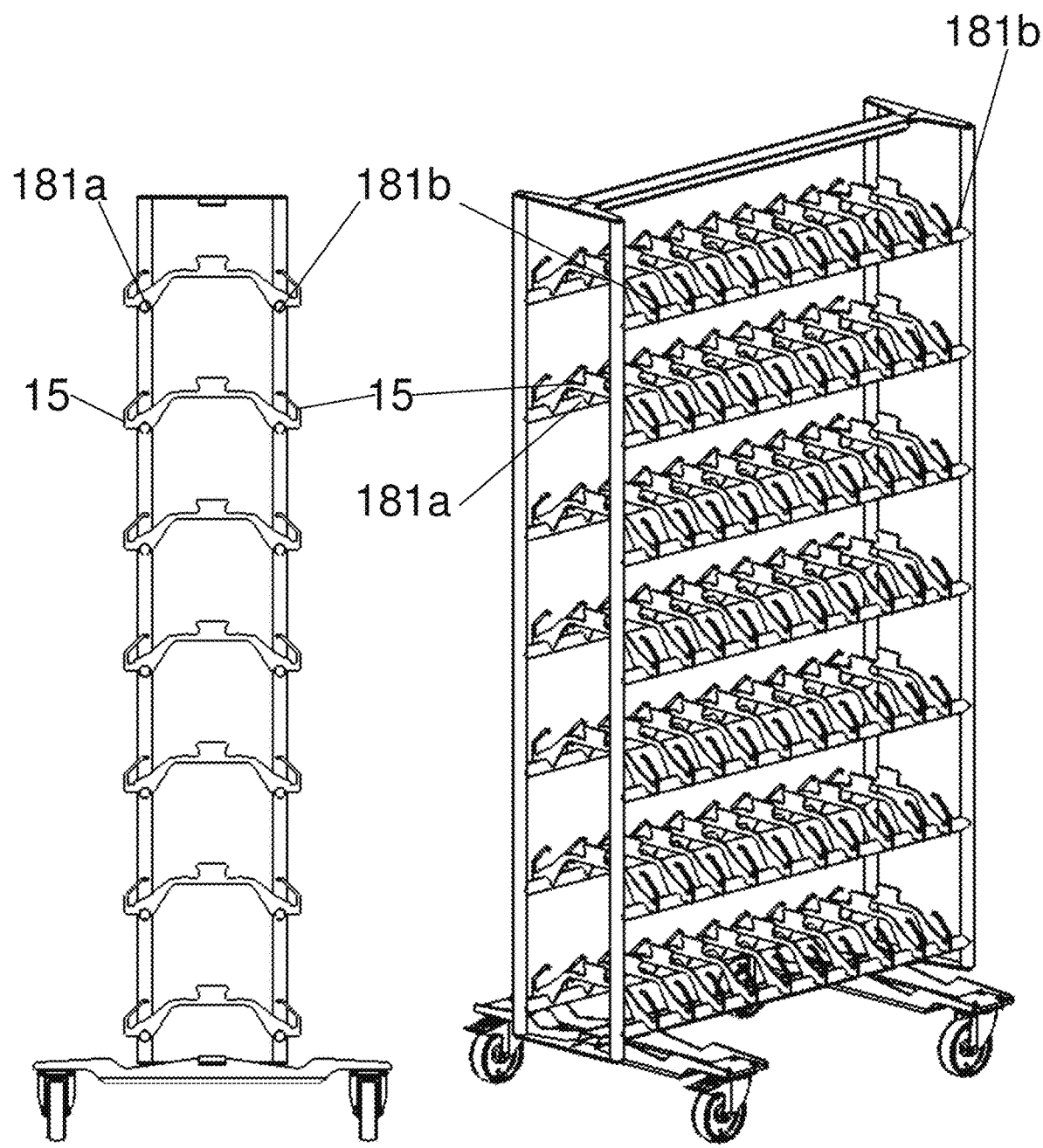
FIGS. 18a, 18b, 19 and 20 show some further possible construction variants of the frame of the rack-type mobile device according to the invention.

With reference to FIGS. 18a and 18b (lateral view and perspective view, respectively), the frame comprises double horizontal members 181a and 181b on the two lateral faces, adapted to secure the stable hooking and positioning elements 15 on both sides. The double horizontal elements may lie in a fixed or vertically adjustable position.

Figure 19:
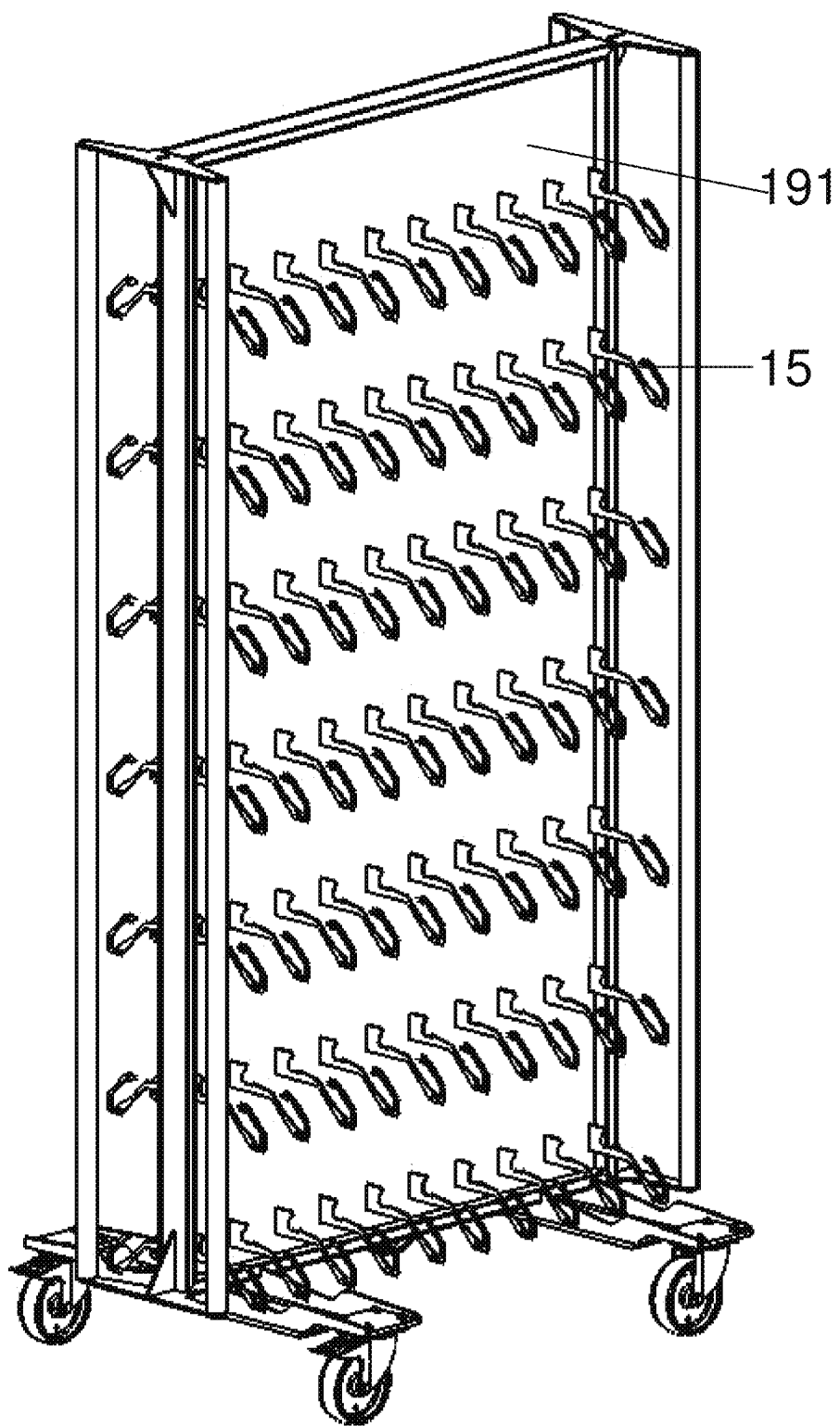

With reference to FIG. 19 (perspective view), the frame comprises a vertical central laminar structure 191 whereon the stable hooking and positioning elements 15 are fixed. Preferably, the laminar structure is made of metallic or plastic material.

Figure 20:
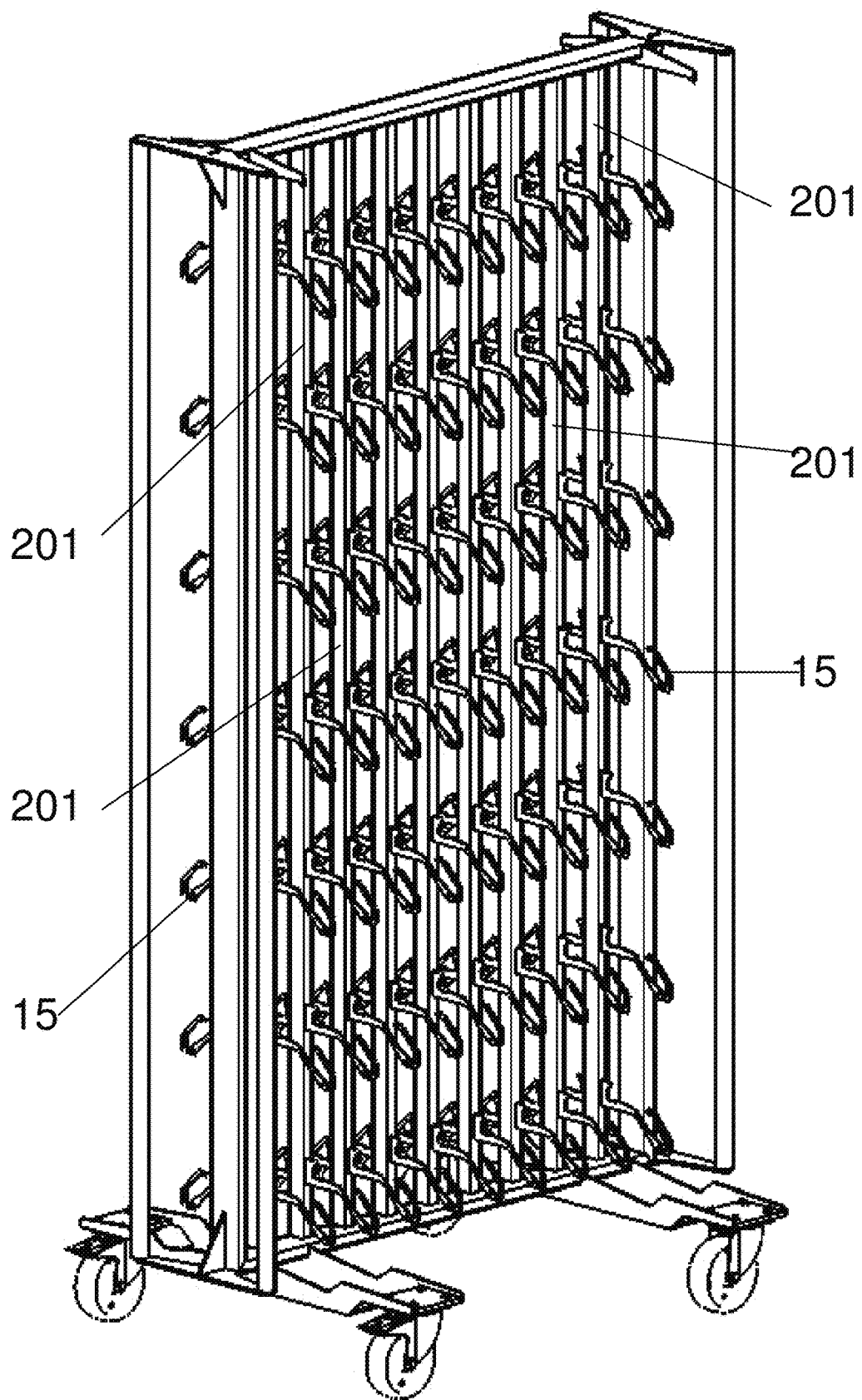

With reference to FIG. 20 (perspective view), the frame comprises further vertical members 201 whereon the stable hooking and positioning elements 15 are fixed. The further vertical members are in a number corresponding to each vertical row of hooks, and may be set in a fixed or horizontally adjustable position.

Therefore, the frame comprises a load-bearing structure 10 adapted to support the elements that support the stable hooking and positioning elements 15 of all of the above-described frame variants. The load-bearing structure 10 may comprise substantially straight or curvilinear members.

For moving the mobile device, some possible variants of the above-described moving device 11, connected to the frame base, may consist of systems movable on rails. The rails may either rest on the ground (connected to the frame base) or be arranged at the top (connected to the frame roof). As a further alternative, automatic moving devices may be provided, e.g., computer-controlled ones.

The base, top and lid types shown herein are merely illustrative and non-limiting, since the mobile presentation device of the invention is applicable to all products and parts thereof available on the market for this kind of application.

Also the number of rows is merely indicative and typical of this application: by optimizing the gap for smaller cages only, for example, racks can be created wherein row density is further increased.

The most important advantages of the mobile presentation device of the invention, compared with prior-art racks, are the following:
 1. Increased number of rows, the height of the mobile device being equal, resulting in an increased number of cages, tops and lids that can be loaded (by way of non-limiting example, from 4 rows to 6 rows for an available height of 2,100 mm, the type of presentable bases being the same);
 2. Full possibility of configuring the number of rows: for example, by implementing the hooking systems between the horizontal members 10" and the vertical members 10' by means of quick-coupling or removable or continuously adjustable systems, it is possible to prearrange the mobile device for reconfiguring also the row positions in order to optimize productivity in relation to the type of load and to allow loading bigger objects (e.g., by increasing or reducing the number of rows or changing the distance between them). In this regard, in fact, there is no limitation to the number of rows, which may range from 1 to the maximum number of installable rows depending on the maximum acceptable height of the mobile device. This will not exclude the possibility of building the entire mobile device by using fixed connection systems, if no need for further adjustments is felt by the customer.

3. Full possibility of configuring and spacing the hooking systems: in this case as well, by implementing the device using quick-coupling and/or removable systems it is possible to produce and configure hooks having different profiles according to the load requirements, suitably spaced for that specific load. This will not exclude the possibility of building the entire device with fixed connection systems, if this option is not required.

4. Stable presentation and containment of bases also in the lateral direction, allowing partial loads and avoiding washing and/or rinsing liquid stagnation areas;

5. Stable presentation and containment of tops, avoiding washing and/or rinsing liquid stagnation areas;

6. Stable presentation and containment of lids, avoiding washing and/or rinsing liquid stagnation areas, and preventing the lids from being thrown off the mobile device by the washing pressure.

The above-described non-limiting examples may be subject to further construction variations without however departing from the protection scope of the present invention.

The elements and features shown in the various preferred embodiments may be combined together without however departing from the protection scope of the present invention, in accordance with the dependency structure of the following claims.

From the above description, those skilled in the art will be able to produce the object of the invention without introducing any further construction details.

What is claimed is:

1. A rack-type mobile device for presenting parts of breeding cages for washing, the device being adapted to be inserted into a washing/rinsing machine for use in pharmaceutical preclinical research centres, the device comprising:
    a load-bearing structural frame for said parts of breeding cages;
    means adapted for moving said mobile device, connected to said frame;
    one or more hooking and positioning elements for hooking and positioning said parts of breeding cages on said device, said hooking and positioning elements being located on at least one lateral part of the frame and being constrained to said load-bearing structural frame; said hooking and positioning elements being shaped as an open hook tilted downwards relative to a horizontal plane, with a hook bottom facing outwards from said lateral part of the mobile device, and a hook tip facing inwards, said open hook having such a width as to be able to internally house at least a part of said parts of breeding cages.

2. The device as in claim 1, wherein said open hook has a terminal part of said hook tip which is bent towards an inside of the hook, so that only said terminal part of the hook tip will come in contact with said part of said parts of breeding cages, when present, said part of said parts of breeding cages also in contact with said hook bottom.

3. The device as in claim 1, comprising one or more countering elements for countering a thrust exerted by a pressure of a washing liquid of said washing/rinsing machine against said parts of breeding cages, said countering elements being connected in an oscillating fashion either to said load-bearing structural frame or to said hooking and positioning elements, so as to rest against said parts of breeding cages, when present.

4. The device as in claim 1, wherein said hooking and positioning elements comprise a recessed zone behind said hook, which is adapted to contain and support an edge of said parts of breeding cages.

5. The device as in claim 1, wherein said hooking and positioning elements comprise a U-shaped seat with an opening oriented towards an inside of said mobile device above said hook, said seat being adapted to contain an edge of a said parts of breeding cages.

6. The device as in claim 1, wherein said hooking and positioning elements have a dual structure made as one piece, which extends on both lateral parts of said load-bearing structural frame, comprising two opposing hooks.

7. The device as in claim 3, wherein each one of said one or more countering elements comprises:
    at least two vertical supporting elements hinged to fastening points connected in an oscillating fashion to either said load-bearing structural frame or said hooking and positioning elements;
    one or more longitudinal elements connected to said at least two vertical supporting elements.

8. The device as in claim 1, wherein said means adapted for moving said mobile device are arranged at a base of said load-bearing structural frame and comprise rotary members or systems movable on rails, or are arranged in a top part of said load-bearing structural frame and comprise systems connected in a rail fashion on said top part of the frame, said means adapted for moving being manually or automatically controlled.

9. The device as in claim 1, wherein said load-bearing structural frame comprises:
    horizontally developing members, in a central position on said frame, adapted to support said hooking and positioning elements.

* * * * *